Nov. 4, 1952  A. THOUSAND  2,616,740
SAFETY LOCKING MOTOR VEHICLE DOOR HANDLE
Filed May 22, 1950

INVENTOR.
Adolph Thousand,
BY Victor J. Evans & Co.
ATTORNEYS

Patented Nov. 4, 1952

2,616,740

UNITED STATES PATENT OFFICE 2,616,740

SAFETY LOCKING MOTOR VEHICLE DOOR HANDLE

Adolph Thousand, Cedar Rapids, Iowa

Application May 22, 1950, Serial No. 163,405

2 Claims. (Cl. 292—350)

This invention relates to inside door handles particularly adapted for motor vehicles where it is desired to prevent children opening doors and falling from traveling vehicles, and in particular this invention relates to an inside door handle mounting wherein a flanged base on the end of the handle is mounted in a hub on the door actuating shaft and the handle is secured in the operative position by a set screw.

The purpose of this invention is to provide means for releasing inside door handles of motor vehicles and other equipment to prevent the doors being accidently opened.

Numerous accidents have occurred due to doors being accidently opened by children and other persons in a vehicle while the vehicle is in motion. With this thought in mind this invention contemplates an inside handle for doors of motor vehicles and other equipment in which the handle is mounted in such a manner that by actuating a set screw therein it is released from the door operating instrumentalities so that the handle may be rotated without opening the door.

The object of this invention is, therefore, to provide means for mounting a handle on the inside of a door whereby the handle may be used for opening the door and also in which the handle may be released from the operating mechanism so that it may be moved without opening the door.

Another object of the invention is to provide an improved mounting for door handles of motor vehicles and the like that may be incorporated in vehicles now in use.

A further object of the invention is to provide an improved mounting for inside door handles of motor vehicles having releasable means therein, which is of a simple and economical construction.

With these and other objects and advantages in view the invention embodies a hub mounted on an inside handle shaft of a motor vehicle door with means for freely mounting a handle therein and with means for locking the handle in the hub.

Other features and advantages of the invention will appear from the following description taken in connection with the drawings wherein.

Figure 1:
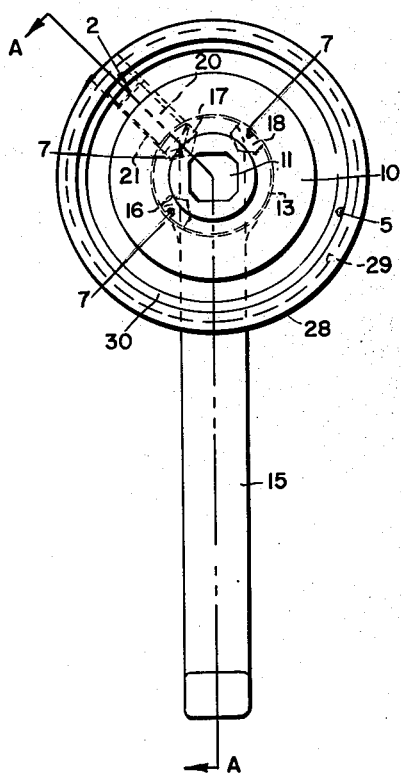
Figure 1 is an end elevational view showing the improved handle mounting looking toward the inside of the hub.

Referring now to the drawings wherein like reference characters denote corresponding parts the handle mounting of this invention includes a hub 10 having a shaft receiving opening 11 therein with openings 12 for receiving a pin or set screw to secure the hub on the shaft. The outer surface of the hub 10 is provided with a counterbore 13 in which a base 14 of a handle 15 is positioned as shown in Figure 2.

Figure 2:
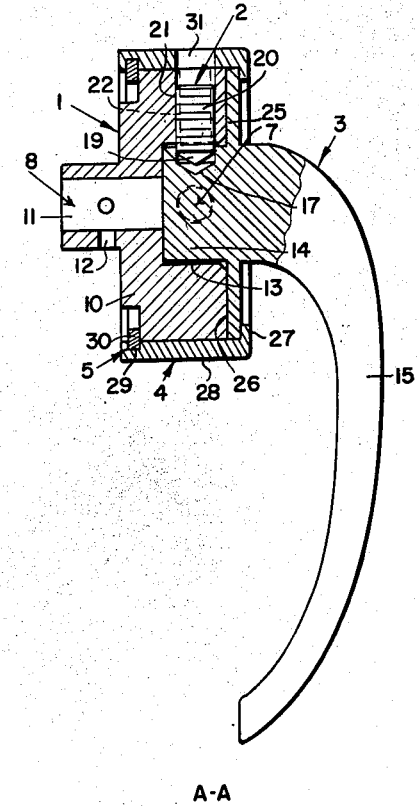
Figure 2 is a side elevational view with part of the handle broken away and with the mounting elements shown in section.
Figure 3:
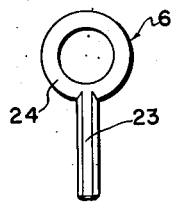
Figure 3 is a detail showing a side elevational view of a key adapted to be used in the lock of the door handle.

The base 15 is provided with a plurality of radially disposed sockets 16, 17 and 18 into which the inner end 19 of a set screw 20 may extend, as shown in Figure 2 with the set screw threaded in an opening 21 through the hub 10. The set screw is provided with a centrally positioned longitudinally extended socket 22, as shown by dotted lines in Figure 2 into which a stem 23 of a key 24 extends and by this means the set screw is moved inwardly or outwardly to lock the handle in relation to the hub or to release the handle from the hub as may be desired.

The handle 15 is provided with a flange 25 that is positioned against the outer face 26 of the hub 10 and the flange is held in position by an annular rim 27 on a cylindrical casing 28, the opposite edge of which is provided with an annular groove 29 into which a split spring ring 30 is positioned as shown in Figure 2.

With the parts arranged in this manner the inner end of the set screw may extend into one of the sockets 16, 17 or 18 to secure the handle in position upon the hub 10 whereby the hub is turned by the handle and by unscrewing the set screw with the key 24 until the inner end 19 is free of one of the notches the handle is free to spin or rotate without turning the hub 10 and door lock actuating shaft.

The cylindrical casing 28 is provided with an opening 31 that is positioned to register with the threaded set screw opening 21, as shown in Figure 2 to provide access to the set screw.

It will be understood that modifications may be made in the design and arrangement of the parts without departing from the spirit of the invention.

What is claimed is:

1. In a handle for the inside of doors of motor vehicles and the like, the combination which comprises a cylindrical hub having a handle receiving socket in one side and having a shaft receiving opening in the other, said cylindrical hub having a radially disposed threaded opening therethrough, a handle having a cylindrical base with a flange thereon and with spaced radially disposed openings in the base, said handle journaled in the hub with one of the said openings positioned to register with the threaded opening of the cylindrical hub, a cylindrical casing having an inwardly extended annular rim in one end positioned over the said hub and base with said annular rim of the casing positioned over the annular flange on the base for retaining the base of the handle in the hub, said casing having an annular groove adjacent the end opposite to that in which the rim is positioned, a split spring ring removably mounted in the said annular groove of the casing and positioned to engage the inner surface of the hub for retaining the casing with the base of the handle therein on the hub, and, a set screw in the opening of the hub adapted to extend into one of the openings in the base of the handle, there being an opening in said casing for gaining access to said set screw.

2. In a handle for the inside of doors of motor vehicles and the like, the combination which comprises a hub having a cylindrical opening extended inwardly from one side and a mounting boss having a square shaft receiving opening extended therethrough and with radially disposed pin holes therein on the other side, said hub having a threaded radially disposed set screw opening therein, a handle having a cylindrical base with space radially disposed openings therein journaled in the opening of the hub with the said openings positioned to register with one of the threaded openings of the hub, a cylindrical casing positioned over the said hub and base of the handle with an annular rim on the inner surface of one end for retaining the base of the handle in the hub and with an annular groove adjacent the end opposite to that in which the annular rim is positioned, a split spring ring removably mounted in the said annular groove of the casing and positioned to engage the inner surface of the hub for retaining the casing with the base of the handle therein on the hub, said casing having an opening therethrough positioned to register with the threaded opening of the hub and openings in the base of the handle, and a set screw in the opening of the hub adapted to extend into one of the openings in the base of the handle, there being an opening in said casing for gaining access to said set screw.

ADOLPH THOUSAND.

REFERENCES CITED

The following references are of record in the file of this patent:

UNITED STATES PATENTS

| Number | Name | Date |
|---|---|---|
| 77,306 | Rawlinson | Dec. 13, 1904 |
| 2,046,342 | Muck et al. | July 7, 1936 |
| 2,190,951 | Roach | Feb. 20, 1940 |
| 2,197,508 | Peo | Apr. 16, 1940 |
| 2,473,937 | Cameron | June 21, 1949 |